(12) United States Patent
Schaffhauser

(10) Patent No.: US 9,358,844 B2
(45) Date of Patent: Jun. 7, 2016

(54) TIRE WITH GREATER RESISTANCE TO UNSEATING

(75) Inventor: Luc Schaffhauser, Chamalieres (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 543 days.

(21) Appl. No.: 13/581,446

(22) PCT Filed: Feb. 2, 2011

(86) PCT No.: PCT/EP2011/051443
§ 371 (c)(1),
(2), (4) Date: Oct. 11, 2012

(87) PCT Pub. No.: WO2011/104074
PCT Pub. Date: Sep. 1, 2011

(65) Prior Publication Data
US 2013/0233460 A1 Sep. 12, 2013

Related U.S. Application Data

(60) Provisional application No. 61/350,784, filed on Jun. 2, 2010.

(30) Foreign Application Priority Data

Feb. 26, 2010 (FR) ...................................... 10 51391

(51) Int. Cl.
| | | |
|---|---|---|
| B60C 15/05 | (2006.01) | |
| B60C 15/02 | (2006.01) | |
| B60C 15/00 | (2006.01) | |
| B60C 15/06 | (2006.01) | |

(52) U.S. Cl.
CPC ............. *B60C 15/02* (2013.01); *B60C 15/0018* (2013.04); *B60C 15/05* (2013.01); *B60C 15/06* (2013.01); *Y10T 152/10819* (2015.01)

(58) Field of Classification Search
CPC ...... B60C 15/0018; B60C 15/02; B60C 15/05
USPC .................................................. 152/550, 545
See application file for complete search history.

(56) References Cited

U.S. PATENT DOCUMENTS

| | | | |
|---|---|---|---|
| 2,966,933 A | 1/1961 | Boussu et al. | |
| 6,523,591 B1 * | 2/2003 | Billieres et al. | |

(Continued)

FOREIGN PATENT DOCUMENTS

| | | |
|---|---|---|
| EP | 1 705 035 | 9/2006 |
| FR | 1 234 995 | 5/1960 |

(Continued)

*Primary Examiner* — Adrienne C Johnstone
(74) *Attorney, Agent, or Firm* — Cozen O'Connor

(57) ABSTRACT

Tire comprising two beads and a carcass reinforcement anchored in each bead, each bead comprising a plurality of annular reinforcing structures forming at least one anchoring alignment, parallel to a portion of the carcass reinforcement, and an additional stiffening reinforcement formed by one single alignment of at least two annular reinforcing structures and extending between a first end situated a distance H1 from the tangent to the seat-forming bead portion being 20-70% of the anchoring alignment minimum distance H0, the first end lying an axial distance L1 from the interior surface of the tire being 50-85% of the maximum axial width L0 of the bead; and a second end, the second end being radially and axially at the same level as or on the outside of the first end such that the distance LA separating the first and second ends is ≥30% of the mean anchoring alignment length.

9 Claims, 5 Drawing Sheets

(56) References Cited

U.S. PATENT DOCUMENTS

2005/0076989 A1  4/2005  Caretta et al.
2006/0000199 A1  1/2006  Domingo et al.
2009/0114332 A1  5/2009  Daghini et al.

FOREIGN PATENT DOCUMENTS

WO  WO 03/093034   11/2003
WO  WO 2008/001162  1/2008

* cited by examiner

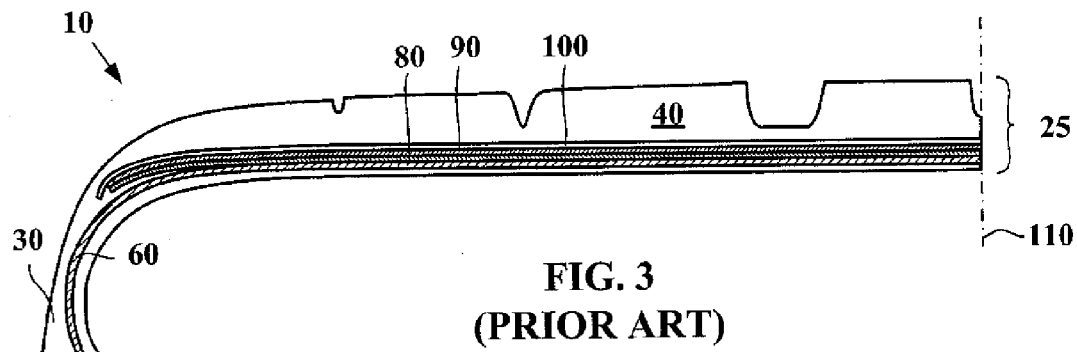
FIG. 3
(PRIOR ART)
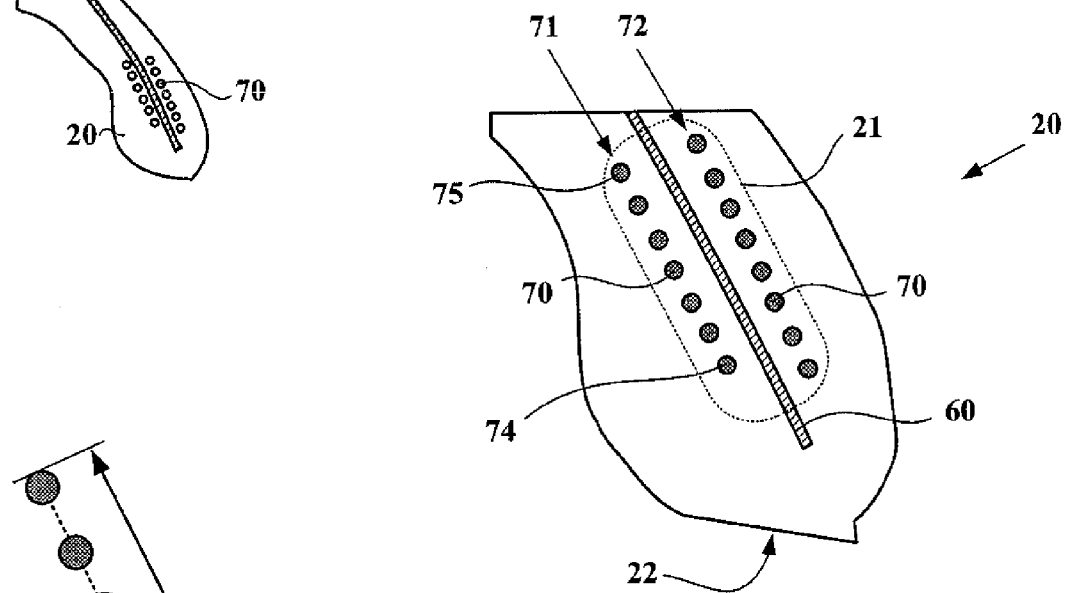
FIG. 4
(PRIOR ART)
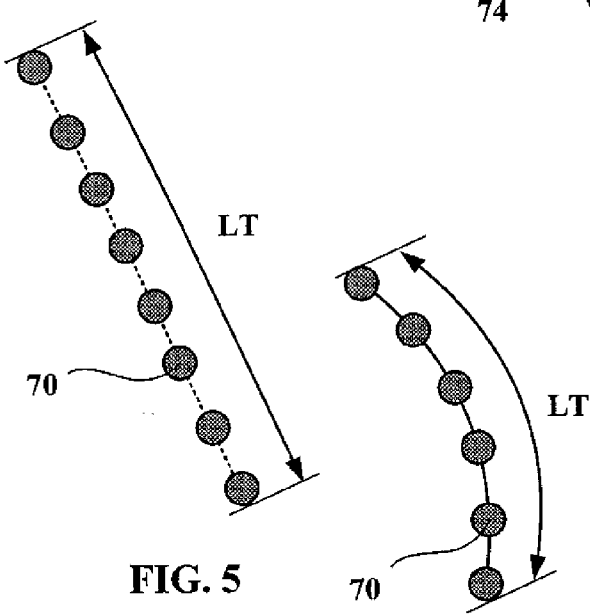
FIG. 5
FIG. 6

TIRE WITH GREATER RESISTANCE TO UNSEATING

RELATED APPLICATIONS

This is a U.S. National Phase Application under 35 USC 371 of International Application PCT/EP2011/051443 filed Feb. 2, 2011.

This application claims the priority of French application no. 10/51391 filed Feb. 26, 2010 and US Provisional application no. 61/350,784 filed Jun. 2, 2010, the content of both of which are hereby incorporated by reference.

FIELD OF THE INVENTION

The present invention relates to tires for passenger vehicles. It relates more particularly to the tires suited for sporty road driving.

BACKGROUND

The ease with which a tire becomes unseated (leaves its rim seat) and then detaches from the rim when its inflation pressure decreases and a transverse force is applied to the tire is one of the tire features that is important to the safety of the passengers of a vehicle fitted with tires. The standardization organizations have therefore set out target values to be obtained (such as in Chinese standard GB/T 2978-2008, for example) and corresponding test methods (such as the method recommended in Chinese standard GB/T 4502-2009, for example). One example of a test method is also described in patent U.S. Pat. No. 3,662,597, whereby a conical form is applied to a sidewall of the tire, then the pressure applied to the sidewall is increased and the sidewall movement is recorded. A similar test method has been adopted in NHTSA (National Highway Traffic Safety Administration, the American Federal Road Safety Organization) Federal Motor Vehicle Safety Standard No. 109.

Most tires designed for sporty road driving have a relatively short sidewall height, and this places them at a disadvantage in unseating tests. The increasingly demanding recommendations laid down by the standardization organizations are creating the need to make these tires even more resistant to unseating and rolling off.

In theory, the resistance to unseating could be increased by bonding the tire to the mounting rim, but this solution has the disadvantage of making the tire very difficult to unmount. It might also be possible to modify the geometry of the rim to make unseating more difficult, but this approach would entail destandardization.

SUMMARY OF THE INVENTION

One object of the present invention is to increase the resistance of a tire to unseating without at the same time making fitting and unmounting more difficult and without requiring a modification to the mounting rims customarily used.

This object is achieved in accordance with one aspect of the invention directed to a tire intended to be mounted on a mounting rim of a vehicle wheel, comprising:
- two beads, each bead comprising at least one anchoring zone and a portion forming a seat intended to come into contact with the mounting rim;
- two sidewalls extending the beads radially outwards, the two sidewalls joining together to form a crown comprising a crown reinforcement surmounted by a tread;
- at least one carcass reinforcement extending from each bead through the sidewall as far as the crown, the carcass reinforcement being anchored in the anchoring zone of the bead.

In any radial cross section, the anchoring zone of each bead comprises a plurality of annular reinforcing structures, the annular reinforcing structures being arranged in such a way as to form at least one anchoring alignment. This at least one anchoring alignment extends over a length LT between a radially innermost annular reinforcing structure and a radially outermost annular reinforcing structure, along a trajectory that is parallel to a portion of the carcass reinforcement.

The bead further comprises, in any radial cross section, an additional stiffening reinforcement formed by one single alignment of at least two annular reinforcing structures, the additional stiffening reinforcement extending between:

a first end situated at a distance H1 from the tangent to the portion forming a seat, the distance H1 being greater than or equal to 20% (and preferably greater than or equal to 30%) and less than or equal to 70% (and preferably less than or equal to 45%) of the minimum distance H0 between: (i) the annular reinforcing structure of said at least one anchoring alignment that is closest to the tangent to the portion forming a seat, and (ii) the tangent to the portion forming a seat, the distances H1 and H0 being measured perpendicular to the tangent, the first end lying an axial distance L1 from the interior surface of the tire, the axial distance L1 being greater than or equal to 50% (and preferably greater than or equal to 70%) and less than or equal to 85% of the maximum axial width L0 of the bead; and a second end, the second end being radially at the same level as or outside of the first end and axially at the same level as or on the outside of the first end.

The second end is chosen such that:

the straight line connecting the first end and the second end forms an angle $\alpha$ (alpha) with the radial direction, the angle $\alpha$ (alpha) being greater than or equal to 0° and less than or equal to 90°; and the distance LA separating the first end and the second end is greater than or equal to 30% of the mean length of the at least one anchoring alignment of annular reinforcing structures.

Preferably, each bead contains only one additional stiffening reinforcement.

For preference, the angle $\alpha$ (alpha) is greater than or equal to 25° and less than or equal to 80°, and more preferably still, greater than or equal to 60° and less than or equal to 75°.

The presence of such an additional stiffening reinforcement has the effect of increasing the resistance of the tire to unseating because unseating entails a rotation of the bead in relation to the mounting rim. During this rotation, an additional stiffening reinforcement positioned as described above has to undergo elongation. Because the additional stiffening reinforcement resists this elongation, the force required to unseat the tire increases.

According to one particular embodiment, each bead comprises at least two anchoring alignments each of which extends along a trajectory that is parallel to a portion of the carcass reinforcement, such that a portion of the carcass reinforcement is sandwiched between two of the at least two anchoring alignments. Such a structure, which is well known per se, improves the anchoring of the carcass reinforcement in the anchoring zone.

According to one particular embodiment, the additional stiffening reinforcement is made of textile. It may in particular be made of an alignment of textile cords or of a strip of textile fabric.

According to one preferred embodiment, the additional stiffening reinforcement is made of metal. The advantage of a metal reinforcement is its greater resistance to elongation. For preference, use will be made of a steel that has a significant elongation before break.

For preference, the annular reinforcing structures that form the additional stiffening reinforcement and the annular reinforcing structures contained in the anchoring zone are of the same kind, which allows to reduce the complexity of the manufacturing stages.

It is advantageous for the number of annular reinforcing structures that make up the additional stiffening reinforcement to be identical to the number of annular reinforcing structures that make up each anchoring alignment in the anchoring zone.

Of course, it is possible, and even desirable, to combine two or more of the embodiments described.

BRIEF DESCRIPTION OF THE DRAWINGS

FIG. 3 depicts, in radial section, a quarter of a tire according to the prior art.

FIG. 4 depicts, in radial section, a bead of a tire according to the prior art.

FIGS. 5 and 6 illustrate the idea of the length of an alignment of annular reinforcing structures.

DETAILED DESCRIPTION OF THE DRAWINGS

Figure 1:
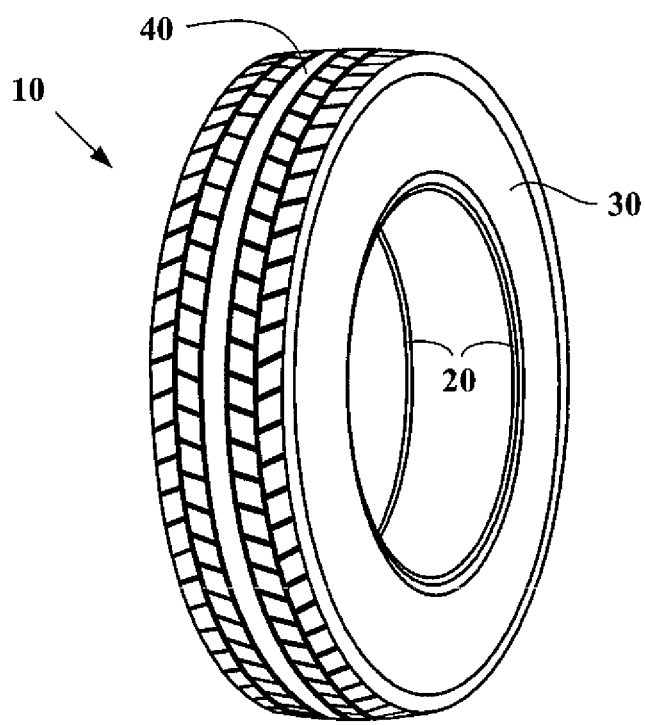
FIG. 1 depicts a tire according to the prior art.

In the use of the term "radial" it is appropriate to make a distinction between a number of different ways in which those skilled in the art use this word. First, the expression refers to a radius of the tire. It is in that sense that a point $P1$ is said to be "radially inside" a point $P2$ (or "radially on the inside of" the point $P2$) if it is closer to the axis of rotation of the tire than is the point $P2$. Conversely, a point $P3$ is said to be "radially outside" a point $P4$ (or "radially on the outside of" the point $P4$) if it is further from the axis of rotation of the tire than is the point $P4$. Progress will be said to be "radially inward (or outwards)" when advancing in the direction of shorter (or longer) radii. In terms of radial distances, it is this meaning of the word that applies also.

By contrast, a thread or a reinforcement is said to be "radial" when the thread or the reinforcing elements of the reinforcement make an angle greater than or equal to 80° or less than 90° to the circumferential direction. Let us specify that in this document, the term "thread" is to be understood in an entirely general sense and includes threads in the form of monofilaments, of multifilaments, of a cord, of a yarn or of an equivalent assembly, and irrespective of the material of which the thread is made or of the surface treatment undergone to enhance its bonding with the rubber.

Finally, what is meant here by "radial section" or "radial cross section" is a section or cross section in a plane containing the axis of rotation of the tire.

An "axial" direction is a direction parallel to the axis of rotation of the tire. A point $P5$ is said to be "axially inside" a point $P6$ (or "axially on the inside of" the point $P6$) if it is closer to the mid-plane of the tire than is the point $P6$. Conversely, a point $P7$ is said to be "axially outside" a point $P8$ (or "axially on the outside of" the point $P8$) if it is further from the mid-plane of the tire than is the point $P8$. The "mid-plane" of the tire is the plane perpendicular to the axis of rotation of the tire and which is equidistant from the annular reinforcing structures of each bead.

A "circumferential" direction is a direction perpendicular both to a radius of the tire and to the axial direction. A "circumferential section" is a section in a plane perpendicular to the axis of rotation of the tire.

Two reinforcing elements are said to be "parallel" in this document when the absolute value of the angle formed between the two elements is less than or equal to 20°. When it is said that an anchoring alignment of annular reinforcing structures extends "along a trajectory parallel to a portion of the carcass reinforcement", that should be understood to mean that, in any radial cross section, the absolute value of the angle between (i) the straight line passing through the center of the radially innermost annular reinforcing structure and through the center of the radially outermost annular reinforcing structure and (ii) the tangent to the portion of the carcass reinforcement between a first point having the same radial position as the radially innermost annular reinforcing structure of the anchoring alignment in question and a second point having the same radial position as the radially outermost annular reinforcing structure of the anchoring alignment, is less than or equal to 30°.

The expression "rubber compound" denotes a rubber compound containing at least one elastomer and at least one filler.

The "interior surface" of the tire denotes the surface of the tire that is intended to be in contact with the gas with which the tire is inflated when the tire is mounted on a mounting rim and inflated to its service pressure. The "exterior surface" of the tire for its part denotes that surface of the tire that is in contact with the atmospheric gases.

In this document, when there is question of a "plurality of annular reinforcing structures", this does not imply that there has to be a superposition of distinct annular structures. The expression also encompasses a spiral winding of a cord the turns of which then form the plurality of annular reinforcing structures. In the latter situation, the "radially innermost annular reinforcing structure" is the turn radially closest towards the inside and the "radially outermost annular reinforcing structure" is the turn that is radially outermost.

Determining the "maximum axial width" $L0$ of the bead does not generally present those skilled in the art with any problem. In the case of a tire in which the transition from bead to sidewall, and therefore the distinction between bead and sidewall, is not obvious, notably when the sidewall is very thick, the bead is considered to extend as far as a radial height equivalent to 50% of the height H of the tire. The height H of a tire is defined as the radial distance between the radially innermost point of the radially innermost annular reinforcing structure and the radially outermost point of the tread. The heights H, H0 and H1, the lengths L0 and L1 and the angle $\alpha$ (alpha) are measured with the tire mounted on a mounting rim and inflated to its service pressure.

When the bead has just one anchoring alignment, the "mean length of the at least one anchoring alignment" is equal to the length of the anchoring alignment.

To make the description of the alternative forms of embodiment shown with the figures easier to understand, the same references are used to denote elements of identical structure.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards and two beads 20 radially on the inside of the sidewalls 30.

Figure 2:
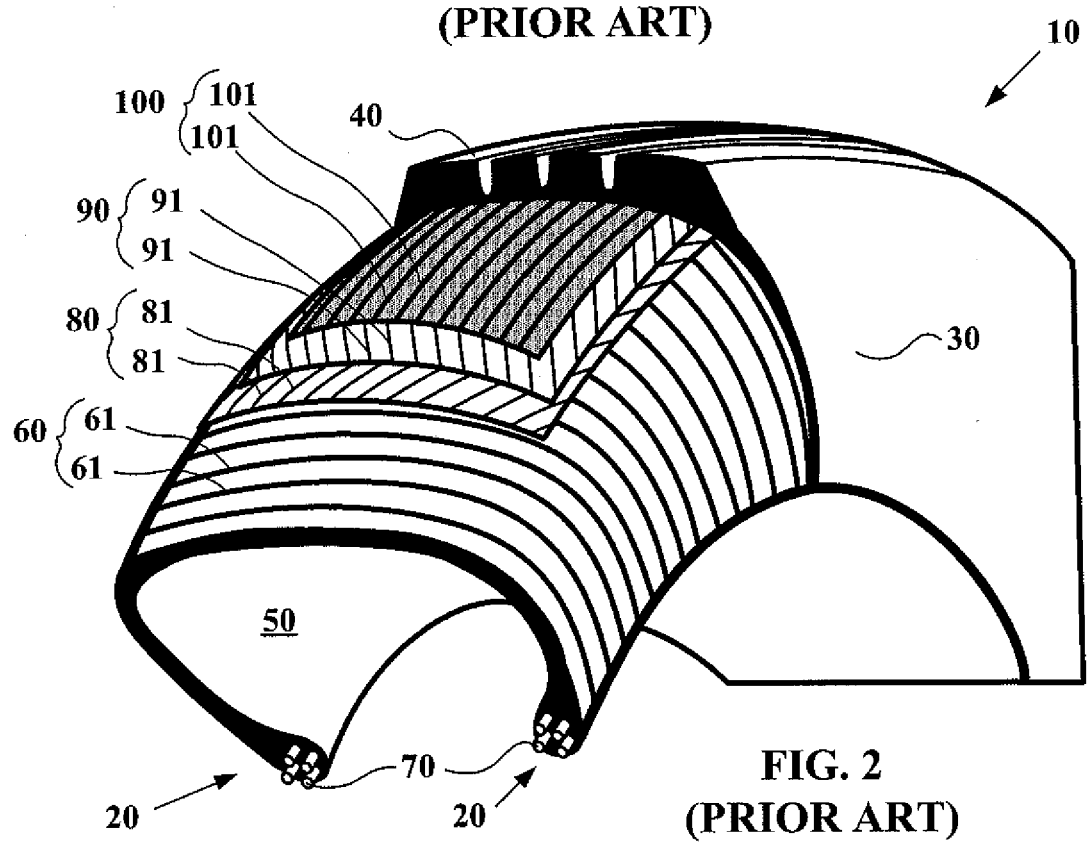
FIG. 2 depicts a partial perspective view of a tire according to the prior art.

FIG. 2 schematically depicts a partial perspective view of a tire 10 according to the prior art and illustrates the various components of the tire. The tire 10 comprises a carcass reinforcement 60 consisting of threads 61 coated with rubber compound, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with thread-like reinforcing elements 81 and 91 which are parallel within each layer and which are crossed from one layer to the other, making angles of between 10° and 70° with the circumferential direction. The tire further comprises a hooping reinforcement 100, arranged radially on the outside of the crown reinforcement, this hooping reinforcement being made up of reinforcing elements 101 directed circumferentially and wound in a spiral. A tread 40 is laid on the hooping reinforcement; it is this tread 40 which provides contact between the tire 10 and the road. The tire 10 depicted is a "tubeless" tire: it comprises an "inner liner" 50 made of a rubber compound impervious to the inflation gas, covering the interior surface of the tire.

FIG. 3 schematically depicts in radial section a quarter of a tire 10 according to the prior art. The tire 10 comprises two beads 20 intended to come into contact with a mounting rim (not depicted), each bead 20 comprising a plurality of annular reinforcing structures 70. Two sidewalls 30 extend the beads 20 radially outwards and join together in a crown 25 comprising a crown reinforcement formed of a first layer of reinforcing elements 80 and of a second layer of reinforcing elements 90, and radially surmounted by a tread 40. The reference 110 denotes the mid-plane of the tire 10.

FIG. 4 depicts, in radial section, a bead 20 of a tire according to the prior art. The bead 20 comprises an "anchoring zone" 21 the extent of which is outlined in dashed line. This anchoring zone 21 comprises the two anchoring alignments 71 and 72 formed of linearly-aligned annular reinforcing structures 70 adjacent to the carcass reinforcement 60 and the rubber compound that fills the space between the various annular reinforcing structures 70 and between the annular reinforcing structures and the carcass reinforcement 60. It is the collaboration between the annular reinforcing structures 70, the rubber compound of the anchoring zone 21 and the portion of the carcass reinforcement 60 that is in contact with this rubber compound that has the effect of anchoring the carcass reinforcement 60 in the bead 20. The anchoring alignment 71 extends over a length LT between the annular reinforcing structure 74 that lies radially closest to the inside, and the annular reinforcing structure 75 that lies radially closest to the outside.

FIG. 5 illustrates how the length LT is determined; this length corresponds to the sum of the diameters of the various annular reinforcing structures 70, to which are added the minimum distances separating two adjacent annular reinforcing structures 70. FIG. 6 illustrates the curved length LT for a non-linear alignment of annular reinforcing structures 70.

Although length LT is shown in FIGS. 5 and 6 as taken over a straight line and a curved line, it should be understood that various other line shapes for the alignment of annular reinforcing structures 70 can be used. One such possibility is an "S" shape, for example, in which case length LT would follow that shape.

The bead 20 depicted in FIG. 4 further comprises a portion forming a seat 22 which seat is intended to come into contact with the mounting rim (not depicted).

Figure 9:
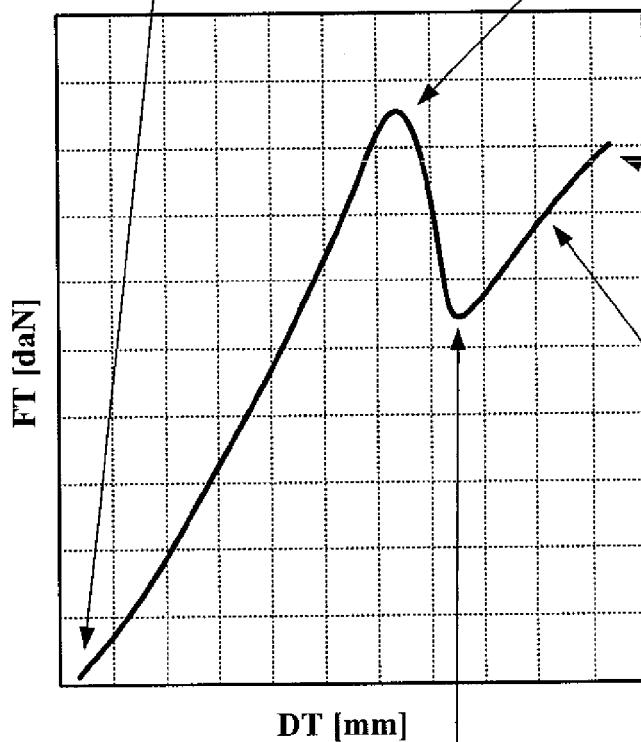
FIG. 9 depicts the movement of the sidewall of a tire as a function of the force applied to the sidewall of the tire during an unseating test.

The graph depicted in FIG. 9 shows the result of numerical simulation of an unseating test in accordance with Chinese Standard GB/T 4502-2009. A conical form is pressed against the sidewall of the tire. This conical form advances at a set rate. The force FT required to advance the conical form at this rate is plotted as a function of the travel DT of the conical form.

Figure 7:
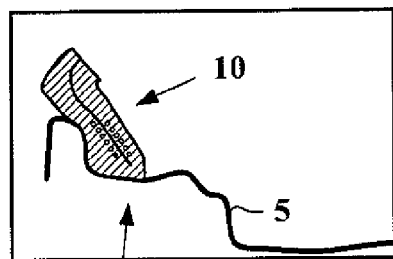
FIGS. 7 and 8 depict, in radial section, two configurations of the tire observed at the start of an unseating test.

The initial situation of the tire 10 (of which only the bead and part of the sidewall are shown) on its mounting rim 5 is depicted in FIG. 7.

Figure 8:
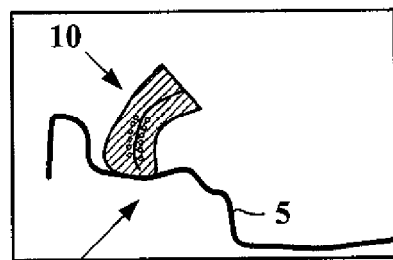
Figure 10:
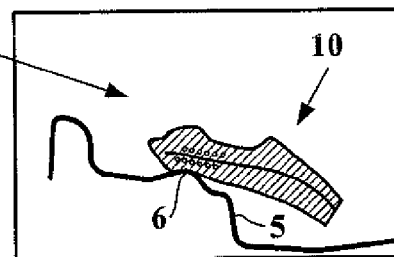
FIGS. 10 to 12 depict, in radial section, three configurations of the tire which were observed at the last stages of an unseating test.
Figure 11:
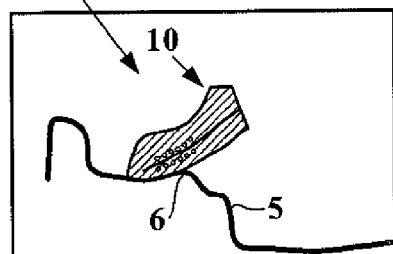
Figure 12:
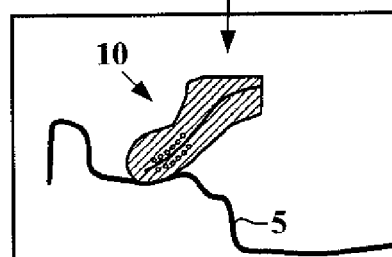

When the conical form moves, the resistance of the tire manifests itself in the near-linear increase in the force FT. The bead begins to move as far as the point where it begins to tilt. This is the situation depicted in FIG. 8. This tilting causes the force needed to advance the conical form to drop until the bead has completely tilted, as depicted in FIG. 12. Next, the force increases again because the bead has to be made to ride up the "hump" 6 of the mounting rim 5, as shown in FIG. 11. It is only when the bead has ridden up over the "hump" 6 (the situation depicted in FIG. 10) that unseating is complete.

As stated above, one of the objectives of the present invention is therefore to increase the resistance of a tire to unseating without at the same time making fitting and removal more difficult and without requiring a modification to the mounting rims that are conventionally used.

This objective has been achieved by providing the bead with an additional stiffening reinforcement.

Figure 13:
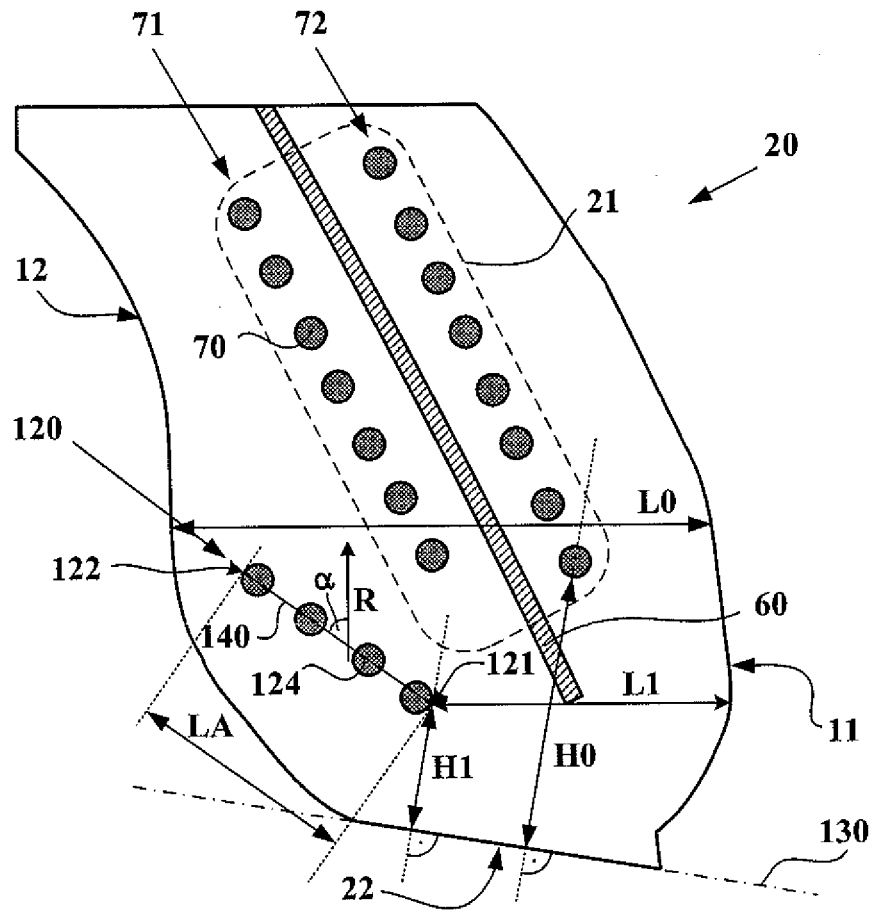
FIG. 13 depicts, in radial section, a bead of a tire according to an embodiment of the invention.

FIG. 13 depicts, in radial section, a bead 20 of a tire according to an embodiment of the invention. The bead 20 comprises an additional stiffening reinforcement 120 formed of one alignment of four metal annular reinforcing structures 124. Advantageously, but not necessarily, the additional stiffening reinforcement of a tire according to the invention is made of metal. In general, a significant improvement in unseating resistance is obtained when the rigidity to elongation (tensile modulus) of the additional stiffening reinforcement is greater than or equal to 50 GPa. An additional stiffening reinforcement made of aramid (tensile rigidity: about 73 GPa) or of steel (tensile rigidity: of the order of 200 GPa) therefore makes it possible to obtain better resistance to unseating.

The additional stiffening reinforcement extends between a first end 121 and a second end 122.

The first end 121 lies a distance H1 from the tangent 130 to the portion forming a seat 22, the distance H1 being greater than or equal to 20% and less than or equal to 70% of the minimum distance H0 between:
  (i) the annular reinforcing structure 70 of the anchoring alignments 71 and 72 that is closest to the tangent 130 to the portion forming a seat 22, and
  (ii) the tangent 130 to the portion forming a seat 22.

The distances H1 and H0 are measured perpendicular to the tangent 130. In this particular instance, $H1=0.45 \cdot H0$.

The first end 121 is also situated an axial distance L1 from the interior surface 11 of the tire, the axial distance L1 being greater than or equal to 50% and less than or equal to 85% of the maximum axial width L0 of the bead. In this particular instance, L1=0.55·L0. Distance L1 is measured along the axial direction, as defined above.

The second end 122 is radially at the same level as or on the outside of the first end (which amounts to stating that it is not radially on the inside of the first end) and axially at the same level as or on the outside of the first end (or in other words, is not axially on the inside of the first end). The second end 122 is chosen such that the straight line 140 connecting the first end 121 and the second end 122 forms an angle α (alpha) with the radial direction (here indicated using the arrow R), the angle α (alpha) being greater than or equal to 0° and less than or equal to 90°. In this particular instance, the angle α (alpha) is equal to 54°.

The distance LA separating the first end and the second end is greater than or equal to 30% of the mean length of the two anchoring alignments 71 and 72 of annular reinforcing structures 70. The distance LA is determined according to the same principle as was mentioned in respect of the anchoring alignments of annular reinforcing structures used to anchor the carcass reinforcement (refer to FIGS. 5 and 6 and the description relating thereto). In this particular instance, LA=0.51·<LT> where <LT> is the mean length of the anchoring alignments 71 and 72. The maximum length of the additional stiffening reinforcement is determined by the geometry of the bead. Thus, it is desirable for the second end 122 of the additional stiffening reinforcement to be separated from the exterior surface 12 of the tire by a layer of rubber compound that is at least 1 mm thick. Likewise, when the angle α (alpha) is small, it will be appropriate to avoid having the end 122 of the additional stiffening reinforcement coming into contact with one of the annular reinforcing structures 70 used to anchor the carcass reinforcement 60.

Figure 14:
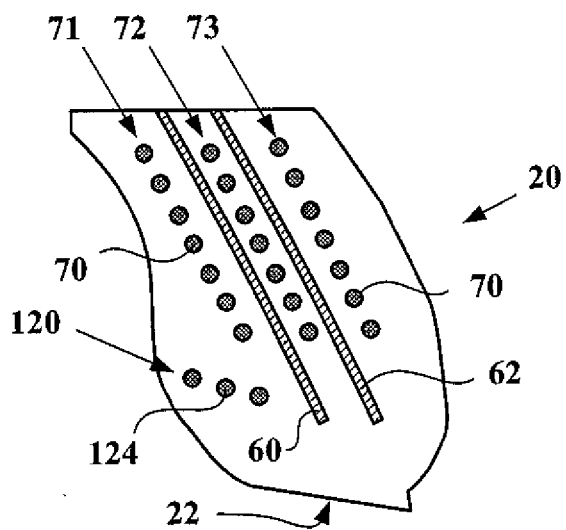
FIGS. 14 depicts, in radial section, a bead of a tire according to an embodiment of the invention.

FIG. 14 depicts, in radial section, the bead 20 of another tire according to an embodiment of the invention. The additional stiffening reinforcement 120 consists of one single alignment of three annular reinforcing structures 124. In this particular instance, the angle α (alpha) is equal to 70°, H1=0.57·H0, L1=0.64·L0 and LA=0.36·<LT>. Unlike the tire depicted in FIG. 13, the tire depicted in FIG. 14 comprises two carcass reinforcements 60 and 62 which are anchored using three anchoring alignments 71, 72, 73 of annular reinforcing structures 70.

Figure 15:
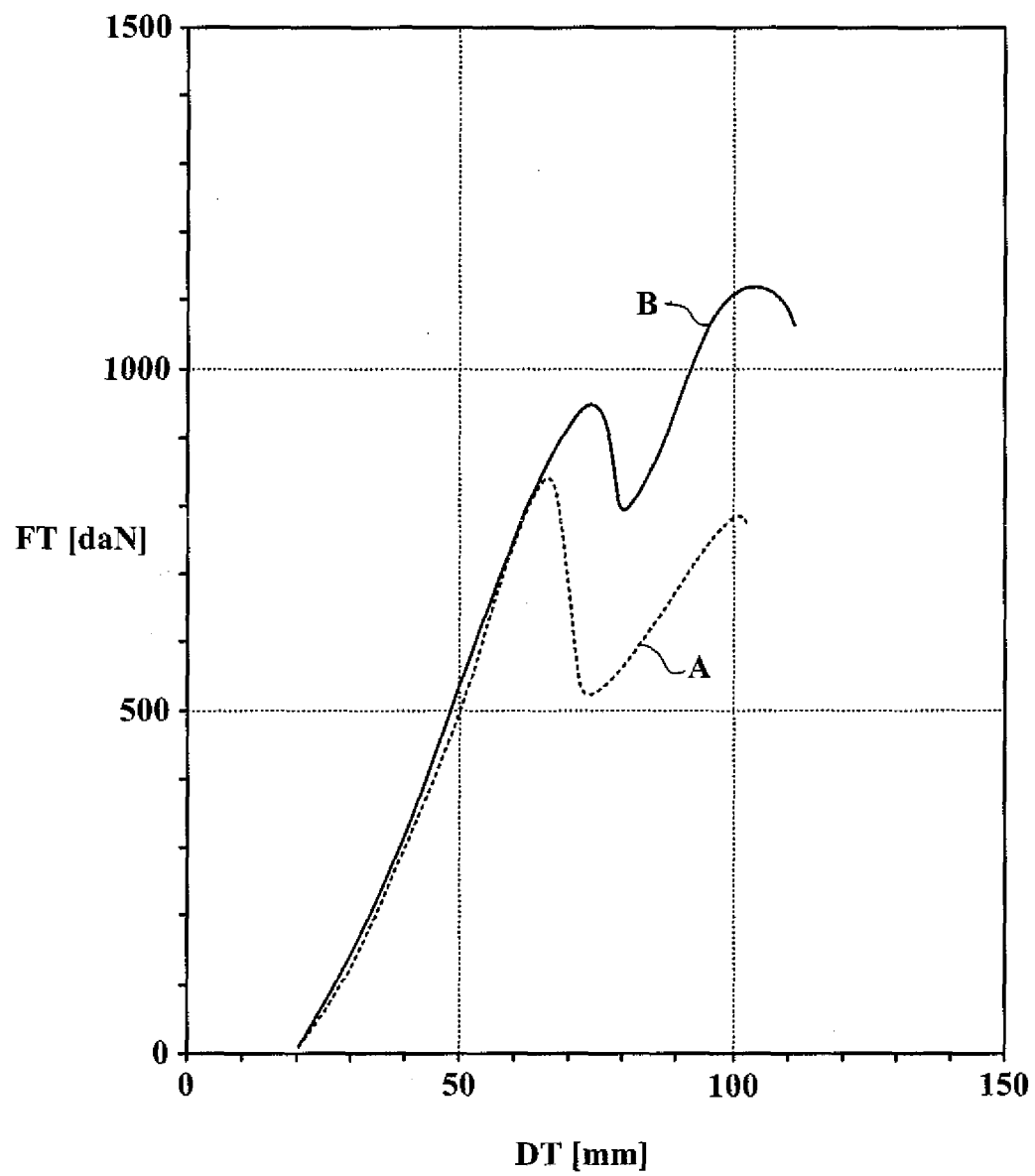
FIG. 15 illustrates the increase in the resistance to unseating which is obtained with a tire according to an embodiment of the invention.

FIG. 15 illustrates the increase in unseating resistance obtained with a tire according to an embodiment of the invention. A tire comprising two beads corresponding to the bead depicted in FIG. 13 was compared against a tire which differed only in its absence of additional stiffening reinforcement. The graph gives the result of an unseating test conducted in accordance with Chinese Standard GB/T 4502-2009. Once again the force FT required to advance a conical form pressed against the sidewall of the tire is plotted as a function of the travel DT of this conical form. Curve B corresponds to a tire according to an embodiment of the invention, curve A to the same tire with no additional stiffening reinforcement. Providing an additional stiffening reinforcement quite clearly increases the resistance of the tire to unseating as quantified in accordance with the above standard.

The invention claimed is:

1. A tire intended to be mounted on a mounting rim of a vehicle wheel, comprising:
   two beads each extending to a radial height of 50% of the radial height H of the tire, each bead comprising at least one anchoring zone and a portion forming a seat intended to come into contact with the mounting rim;
   two sidewalls extending the beads radially outwards, the two sidewalls joining together to form a crown comprising a crown reinforcement surmounted by a tread;
   at least one carcass reinforcement extending from each of said two beads through the sidewall as far as the crown, each carcass reinforcement being anchored in an anchoring zone of the bead;
   wherein, in any radial cross section, the at least one anchoring zone of each bead each comprises a plurality of circumferentially annular reinforcing structures, said annular reinforcing structures being arranged in such a way as to form at least one anchoring alignment, said at least one anchoring alignment extending over a length LT between a radially innermost annular reinforcing structure and a radially outermost annular reinforcing structure, along a trajectory that is parallel to within 30° to a portion of the carcass reinforcement,
   each of said two beads further comprising, in any radial cross section, an additional stiffening reinforcement, the additional stiffening reinforcement extending between:
   (a) a first end situated at a distance H1 from a tangent to said portion forming a seat, the distance H1 being greater than or equal to 20% and less than or equal to 70% of the minimum distance H0 between:
      (i) the annular reinforcing structure of said at least one anchoring alignment that is closest to the tangent to said portion forming a seat, and
      (ii) the tangent to said portion forming a seat, the distances H1 and H0 being measured perpendicular to said tangent, the first end lying an axial distance L1 from the interior surface of the tire, the axial distance L1 being greater than or equal to 50% and less than or equal to 85% of a maximum axial width L0 of the bead; and
   (b) a second end, the second end being radially at the same level as or outside of the first end and axially at the same level as or on the outside of the first end, the second end being chosen such that:
   a straight line connecting the first end and the second end forms an angle α (alpha) with the radial direction, the angle α (alpha) being greater than or equal to 0° and less than or equal to 90°; and
   wherein a distance LA separates the first end and the second end, the distance LA being greater than or equal to 30% of a mean length of the at least one anchoring alignment of annular reinforcing structures,
   and wherein the additional stiffening reinforcement is formed by one single alignment of at least two circumferentially annular reinforcing structures.

2. The tire according to claim 1, wherein the distance H1 is greater than or equal to 30% and less than or equal to 45% of the minimum distance H0.

3. The tire according to claim 1, wherein the axial distance L1 is greater than or equal to 70% and less than or equal to 85% of the maximum axial width L0 of the bead.

4. The tire according to claim 1, wherein the angle α (alpha) is greater than or equal to 25° and less than or equal to 80°.

5. The tire according to claim 1, wherein each bead comprises at least two anchoring alignments each of which extends along a trajectory that is parallel to within 30° to a portion of the carcass reinforcement, such that a portion of the carcass reinforcement is sandwiched between two of said at least two anchoring alignments.

6. The tire according to claim 1, wherein the additional stiffening reinforcement is made of textile.

7. The tire according to claim 1, wherein the additional stiffening reinforcement is made of metal.

8. The tire according to claim 1, wherein the annular reinforcing structures that form the additional stiffening reinforcement and the annular reinforcing structures contained in the at least one anchoring zone are of the same kind.

9. The tire according to claim 8, wherein the number of annular reinforcing structures that make up the additional stiffening reinforcement is identical to the number of annular reinforcing structures that make up each anchoring alignment in the at least one anchoring zone.

* * * * *